UNITED STATES PATENT OFFICE.

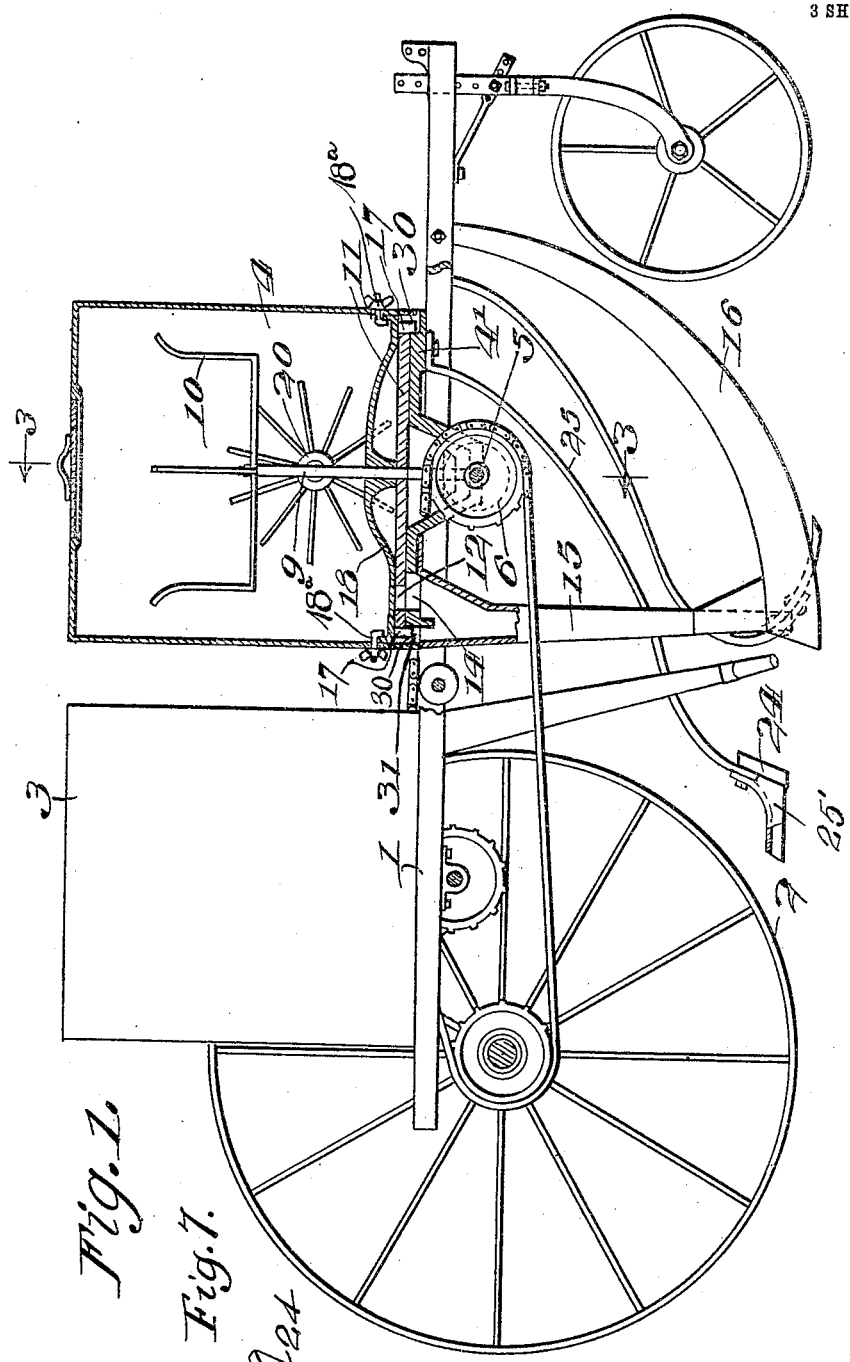

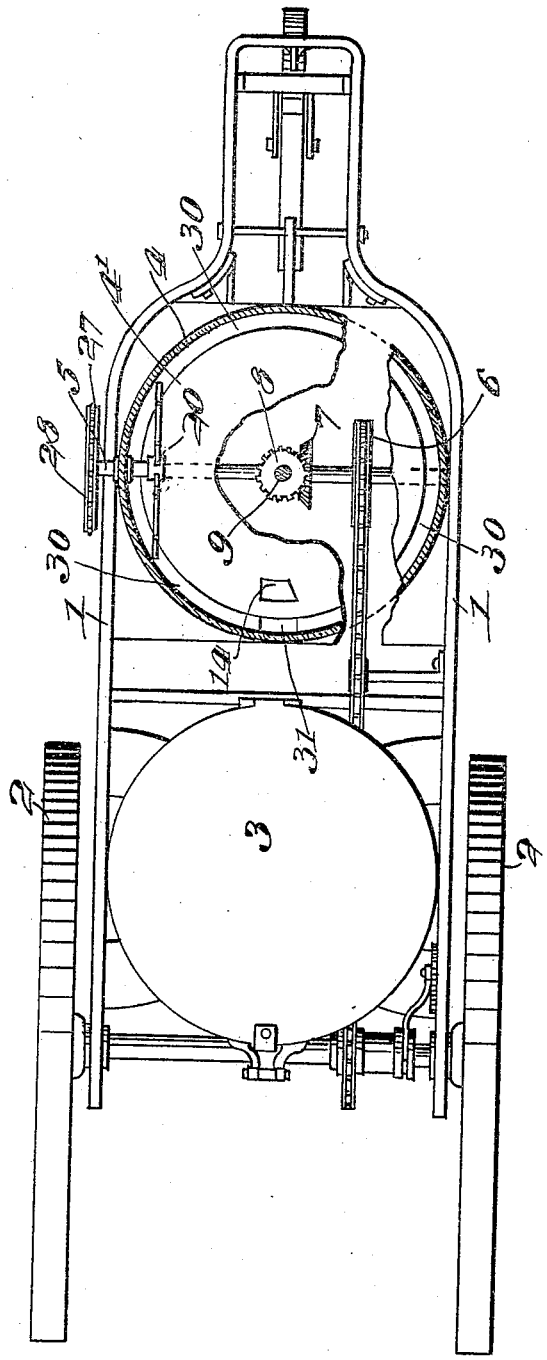

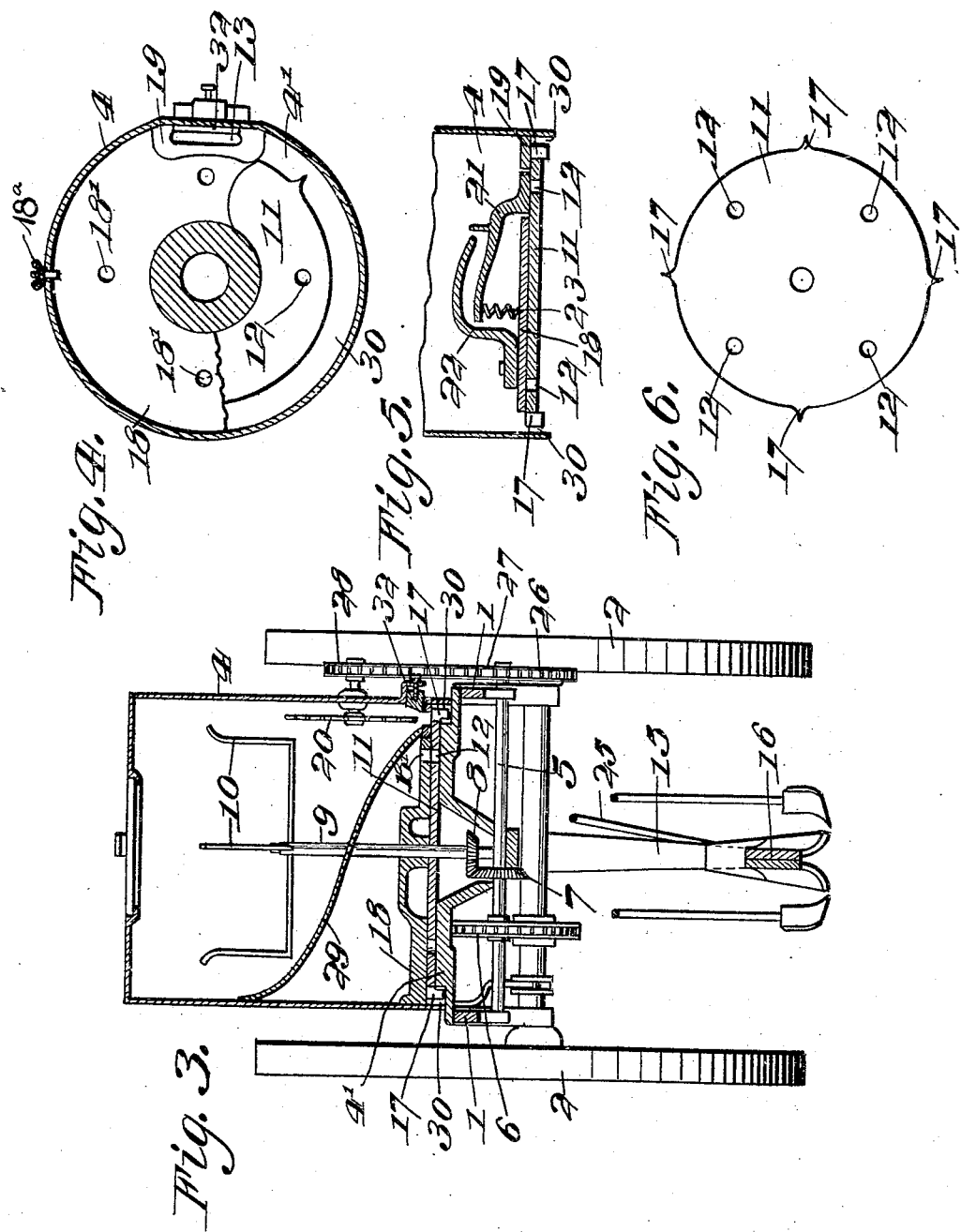

JOSEPH W. LITTLE, OF WEST POINT, MISSISSIPPI.

SEED-PLANTER.

932,302.

Specification of Letters Patent. Patented Aug. 24, 1909.

Application filed October 12, 1908. Serial No. 457,352.

*To all whom it may concern:*

Be it known that I, JOSEPH W. LITTLE, a citizen of the United States, residing at West Point, in the county of Clay and State of Mississippi, have invented certain new and useful Improvements in Seed-Planters; and I do declare the following to be a full, clear, and exact description of the invention, such as will enable others skilled in the art to which it appertains to make and use the same.

This invention relates to improvements in seed planters especially adapted for planting corn, cotton or the like, and has for its object to improve on the construction shown and described in my Patent No. 838,345, dated Dec. 11, 1906.

With this and other objects in view, the invention consists of certain novel features of construction, combination and arrangement of parts, as will be more fully described and particularly pointed out in the appended claims.

In the accompanying drawings, Figure 1 represents a longitudinal vertical section of the machine constructed in accordance with this invention and showing a fertilizing distributer in connection therewith; Fig. 2 represents a horizontal section thereof; Fig. 3 represents a vertical cross section taken through the feed hopper on the line 3—3 of Fig. 1, and looking in the direction of the arrow; Fig. 4 shows a horizontal section taken through the feed hopper; Fig. 5 is a detail sectional view showing the feeding mechanism for corn, sorghum and other grains; Fig. 6 is a top plan view of one form of feed plate or disk; and, Fig. 7 is a perspective view of the scraper detached.

In the embodiment illustrated a frame 1 is shown which may be of any suitable construction mounted on ground wheels 2. Mounted on this frame 1, is a fertilizer containing hopper 3, and a seed hopper 4 arranged at the front thereof. A shaft 5 extends transversely of the machine under the seed hopper 4 and is mounted in any suitable manner. Mounted on this shaft 5 is a sprocket wheel 6 and a beveled gear 7, which latter meshes with a beveled gear 8 secured to a vertical shaft 9. This shaft 9 passes upwardly through the bottom or base 4' of the hopper 4 and has mounted thereon an agitator 10, and a feed disk or plate 11. This feed disk or plate 11 is detachably connected to the shaft 9 to provide for its being readily removed and another plate substituted therefor when desired. The disk 11 here shown is provided with four openings as 12, for the reception of the seed to be planted which falls into said openings 12, and by the disk 11 are conveyed to the outlet 14 in the rear of the hopper bottom 4' through which they pass into the discharge spout 15, and are thus conveyed to the furrow opened by a furrow opening 16, of ordinary construction. Any desired number of feed plates may be provided, five being preferably furnished with each machine, and provided with varying numbers of holes and sweeps for planting corn, and placing cotton seed in hills at varying distances apart.

The plate shown in Fig. 6 is provided with four openings 12, as above described, designed for planting corn and with four sweeps as 17 for planting cotton seed. The cover 18 having orifices 18' is placed over the feed plate and is composed of two parts, the part 19 being fixed and contains, as shown, an opening 13 for the cotton seed, the removable part 18 and fixed part 19 being close fitting to prevent seed of any kind from passing between them. The plate 19 is fixed to the bottom or base 4' of the hopper and the plate 18 is removable and is secured within the hopper by eccentric clamps or locks 18$^a$. This plate 18 having orifices 18' is made removable to provide for the ready change of the feed plates or disks without necessitating removal of the hopper from its base or the feed or discharge wheel 20, mounted within said hopper. The openings 12 shown in the disk 11 in Fig. 4 indicate the space that the corn or other grain occupies while said grains are being planted, the remainder of the disk being covered by the plate 18, as clearly shown in Fig. 4.

An adjustable slide or cut off 32 having its lower surface corrugated to fit corrugations in the plate 19 is arranged to regulate the size of the outlet 13 to determine the quantity of seed fed therethrough, and to close said opening 13 when planting corn, sorghum, peas or other seed.

A cut off 21 for corn or other grain is secured within a case or cover 22 (see Fig. 5) which is fastened to the plate 18, and extends through an opening in the plate 18, and is arranged in position to bear on the feed disk 11 over the openings 12 therein and designed to cut off or brush away superfluous seed and allow only a predetermined number to be carried in the openings 12. A spring 23 is arranged under the cut-off 21 for holding it normally in position upon the disk 11 with sufficient pressure to permit only a few grains to pass into the openings 12, and to prevent seed from being carried on the disk 11 which is spaced below the plate 18.

A covering member or scraper 24 is mounted on a spring member 25 secured at one end to the frame 1, and is designed as a substitute for a covering wheel. This member 24 is especially designed for use in planting such grain as corn, sorghum and peas which require considerable pressure, but which is not practicable for use in planting cotton seed, which does not require to be packed. This scraper 24 is preferably constructed of wood or steel in the form shown in Figs. 3 and 7 being cut out at the center of its lower edge with its sides sloped backward toward the middle to cause the earth to be easily drawn upon the fertilizer and grain leaving a small ridge over the grain. A curved presser member 25′ is attached at the rear of the scraper 24 and is preferably made just wide enough to press the earth in the middle of the ridge upon the seed. The narrower it is made to be operative, the better, the preferable width being about one inch or one and one-half inches and it is preferably made from malleable iron or steel.

The shaft 5 extends entirely across the machine from the right to the left and projects a sufficient distance to permit a sprocket wheel 26 to be mounted thereon. This sprocket wheel 26 is connected by a chain 27 with a sprocket wheel 28 by means of which the feed or discharge wheel 20 is revolved when the machine is in operation. This wheel 20 is designed for forcing cotton seed into the opening 13.

When it is desired to plant hills two feet or more apart, the sprocket wheels 26 and 28 may be reversed which will cause the feed wheel 20 to move slower and force a small amount of seed through the opening 13. A false bottom 29 is removably disposed within the hopper 4 to provide for the ready feeding of the cotton seed to the opening 13 and is inclined from the right to left side of said hopper. A groove 30 is arranged in the bottom 4′ of the hopper to cause the cotton seed to be removed by the scrapers 17 of the feed disk 11 from the opening 13 to the opening 31 through which they will fall into the discharge spout 15 which conveys them to the desired place of deposit.

The planter herein shown differs from the patent above referred to in that the feed wheel 20, sprocket wheels 26 and 28 and the journals in which the shafts of said sprocket wheels turn have been moved from the right to the left side of the hopper whereby the machine including the fertilizer distributer may be made about one-fourth shorter than that shown in the patent. The removable false bottom has also been changed from the right to left side and the openings shown at the front of the bottom of the hopper in the form shown in the patent has been moved to the back of the hopper in the new structure, the weight and length of the machine being thereby lessened and the machine being much more compact and simple.

The member 25 having the scraper member 24 at the free end thereof, may be provided with elongated eyes to provide for the regulation of the length needed to turn sufficient earth to cover the seed or fertilizer distributed in the furrow.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim and desire to secure by Letters Patent is:—

1. In a seed planter the combination of a wheeled supporting frame, a hopper mounted thereon and having an opening in its bottom and provided with a seed disk, a cover arranged over said seed disk and composed of two parts, one part being removable and the other fixed, said parts being fitted closely together to prevent seed from passing between them, said fixed member being secured to the bottom of the hopper and the removable member provided with eccentric clamps or locks for holding it in position whereby the feed plates or disks may be readily changed without necessitating the removal of the hopper from its position.

2. In a seed planter the combination of a wheeled supporting frame, a hopper mounted thereon and having an opening in its bottom provided with a seed disk, a furrow opener, a discharge spout arranged at the rear thereof and a spring bar depending from said frame and having a scraper at its free end, said scraper being cut out at the center of its lower edge with its side sloped backward toward the middle, and a curved presser member attached at the rear of the scraper adapted to press the earth in the middle of the ridge upon the seed.

In testimony whereof I have hereunto set my hand in presence of two subscribing witnesses.

JOSEPH W. LITTLE.

Witnesses:
R. M. TROTTER,
R. B. DEANES.